Oct. 19, 1948.                    C. C. NASH, JR                    2,451,861
                 METHOD OF CONTROLLING PHASE RELATIONSHIPS
                         IN AN ELECTRONIC CIRCUIT
                            Filed July 24, 1942

Cleve C. Nash Jr. INVENTOR.
BY P. J. Whelan
ATTORNEY

Patented Oct. 19, 1948

2,451,861

UNITED STATES PATENT OFFICE 2,451,861

METHOD OF CONTROLLING PHASE RELATIONSHIPS IN AN ELECTRONIC CIRCUIT

Cleve C. Nash, Jr., Tulsa, Okla., assignor to Standard Oil Development Company, a corporation of Delaware Application July 24, 1942, Serial No. 452,169

2 Claims. (Cl. 179—171)

The present invention is directed to a method for adjusting the gain of an amplifier without changing the phase relationships of the amplifier and has particular reference to the amplification of electrical impulses derived from seismic waves in seismic prospecting.

In seismic prospecting the waves generated by a seismic disturbance are received at selected points and converted into electrical impulses which are amplified and recorded. It has been found that with certain types of amplifiers the desired degree of amplification is attained only at the expense of a change in phase between the amplified signal and the signal itself. This is particularly true of amplifiers in which the degree of amplification is a function of the voltage on one or more elements of a vacuum tube and in which it is desired to change the degree of amplification automatically as a function of the intensity of the signal introduced into the amplifier.

The present invention is based on the discovery that in a vacuum tube amplifier having a plurality of grids, it is possible to adjust the phase relationship between the output and the input of the amplifier by adjusting the ratio of biasing voltages applied to two or more grids. Once the proper ratio of these biasing voltages is determined for the desired phase relationship, the degree of amplification can then be varied by varying the biasing voltages while maintaining said ratio.

Figure 1:
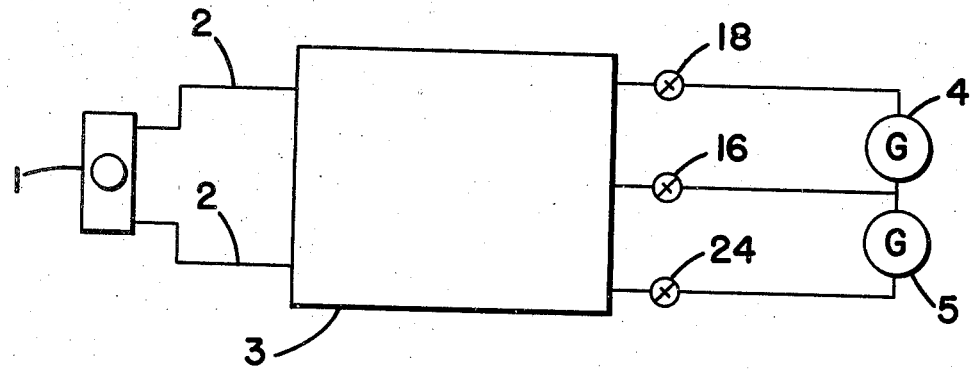
Figure 2:
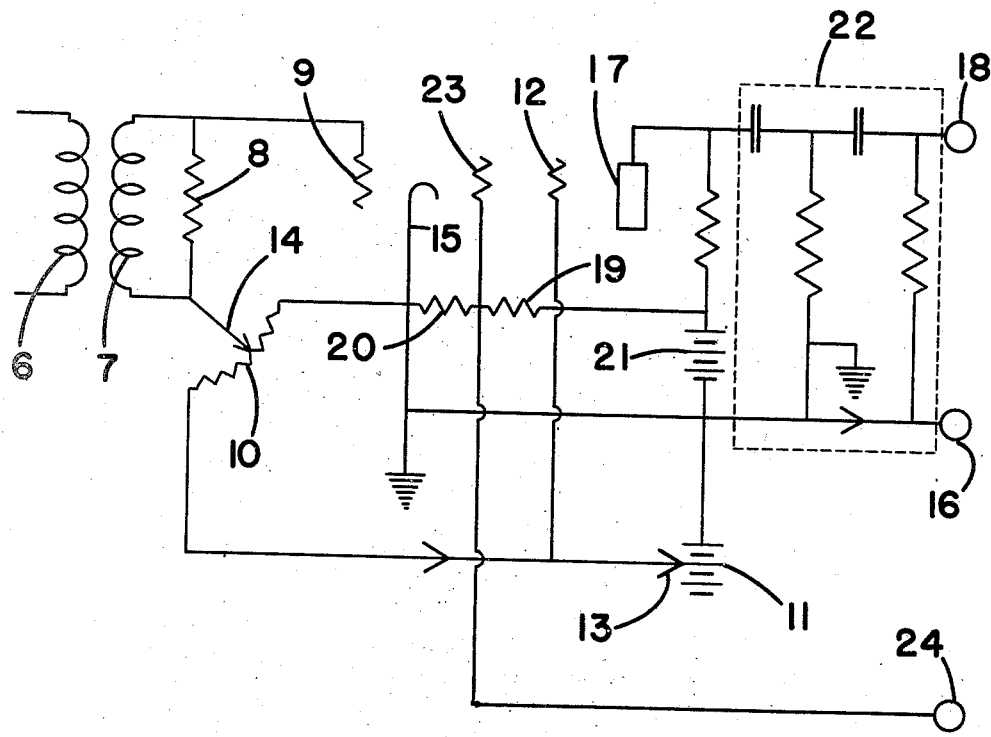

The present invention will be better understood from the following detailed description of the accompanying drawing, in which:

Fig. 1 is a diagrammatic view of one embodiment of the present invention as applied to seismic prospecting; and, Fig. 2 is a schematic view of an amplifier circuit according to the present invention.

Referring to Fig. 1 in detail, numeral 1 designates a geophone or a pickup which is a device for receiving earth vibrations and converting them into electrical impulses. These impulses are delivered by conductors, 2, to an amplifier 3, which in turn delivers to a recording galvanometer 4 a main signal and to recording galvanometer 5 an auxiliary signal. While the apparatus is shown in connection with only one geophone, it will be understood that in practice a number of geophones are employed, and each geophone can be connected to a separate amplifier or any desired number of geophones can be connected to a single amplifier for the production of a composite wave or signal.

The type of amplifier indicated by box 3 may vary so long as it embodies the underlying principles of the present invention. In Fig. 2 is shown one useful embodiment. The signal from the geophone is delivered to the primary 6 of a transformer, the secondary 7 of which is connected across a resistance 8. The voltage across the resistance 8 is applied to the grid 9 of the vacuum tube amplifier. This grid 9 is supplied with a negative biasing voltage derived from the voltage drop across the resistance 10 connected to a battery 11, negative to the cathode, or an equivalent source of potential. Also connected to battery 11 is a second grid 12 which is also negative. The battery 11 is provided with a pointer 13 which permits the adjustment of the voltage applied to the grids 9 and 12. The ratio of these respective biasing voltages is adjusted by the movement of a pointer 14 which is mounted for movement along resistance 10. By adjusting the position of pointer 14 while comparing the phase relationship of the output and input, it is possible to so proportion the biasing voltages that the output and input (measured across the tube or at the output terminals 18 and 19 and the input of the transformer) will be maintained in a constant phase relation as the point 13 is manipulated to secure the desired degree of amplification.

Arranged in the tube is cathode 15 which is connected to an output terminal, 16. A plate 17 is also connected to an output terminal 18 as well as to the cathode through resistances 19 and 20 and to a battery 21, for supplying the plate voltage. Connected in the plate cathode circuit are condensers and resistors so arranged as to form a filter indicated by the rectangle 22 in dotted lines.

Arranged in the vacuum tube is an auxiliary grid 23 which is also connected to battery 21 and is, therefore, positive relative to the cathode and is connected to the plate circuit behind the resistance 19 and is also connected to a terminal 24. The signal which is obtained between terminals 16 and 24 decreases in amplitude as the signal obtained from terminals 16 and 18 increases in amplitude by virtue of adjustment of the position of pointer 13 on the voltage source 11. The production of two signals in this particular type of work is advantageous because it is frequently desirable, as pointed out heretofore, to control the amplification automatically so as to hold the amplification at a low level when the exciting signal is large, and vice versa, and the second signal obtained across the terminals 16 and 24 can be rectified to produce a biasing voltage which may be used instead of battery 11 as the control voltage of the degree of amplification.

The nature and objects of the present invention having been thus described and illustrated, what is claimed as new and useful and is desired to be secured by Letters Patent is:

1. A method for maintaining a constant phase relationship in an amplifier comprising a multigrid vacuum tube having at least a cathode, an anode, a control grid and a suppressor grid, and having an R. C. filter in the anode circuit of the said tube which consists of applying negative biasing voltages to the said control and suppressor grids, and adjusting the ratio of the biasing voltage on one of the said grids to that on the second of the grids until amplification may be varied by changing the value but not the ratio of the said biasing voltages without changing the phase relationship across the amplifier.

2. A method for maintaining a constant phase relationship in an amplifier tube, said tube having at least a cathode, an anode, a control grid, and a suppressor grid, comprising the steps of applying negative biasing voltages to the said control and suppressor grids and adjusting the ratio of the negative biasing voltages on the two grids until amplification may be varied by changing the value but not the ratio of the said biasing without changing the phase relationship between the anode and cathode of the said amplifying tube.

CLEVE C. NASH, Jr.

REFERENCES CITED

The following references are of record in the file of this patent:

UNITED STATES PATENTS

| Number | Name | Date |
| --- | --- | --- |
| 1,756,893 | Warner | Apr. 29, 1930 |
| 1,997,665 | Wheeler | Apr. 16, 1935 |
| 2,109,760 | Urtel | Mar. 1, 1938 |
| 2,231,955 | Schrader | Feb. 18, 1941 |
| 2,237,420 | Ferris | Apr. 8, 1941 |
| 2,241,581 | Boucke | May 13, 1941 |
| 2,250,559 | Weber | July 29, 1941 |
| 2,254,243 | Ripley | Sept. 2, 1941 |
| 2,273,107 | Herold | Feb. 17, 1942 |
| 2,302,866 | Hunt | Nov. 24, 1942 |
| 2,303,357 | Hoover, Jr. | Dec. 1, 1942 |